Figure 1:
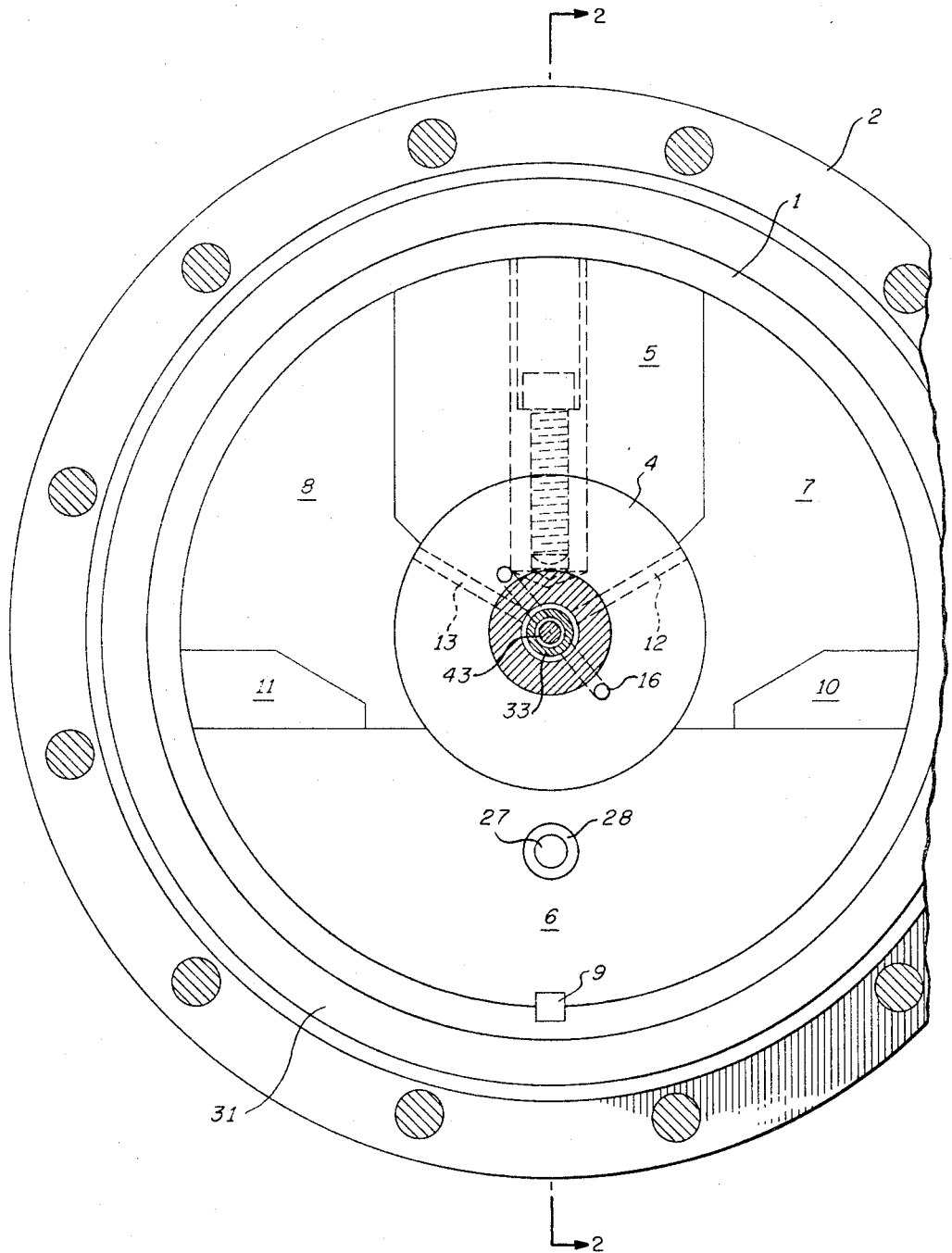

INVENTORS
BENJAMIN Q. BERTRAM
RONALD WALTER
BY
SC Yeaton
ATTORNEY

United States Patent Office 3,272,082
Patented Sept. 13, 1966

3,272,082
HYDRAULIC APPARATUS
Benjamin Quesenbury Bertram, Staines, and Ronald Walters, Wembley, England, assignors to The Sperry Gyroscope Company Limited, Brentford, England, a company of Great Britain
Filed Jan. 13, 1964, Ser. No. 337,327
Claims priority, application Great Britain, Jan. 16, 1963, 1,978/63
6 Claims. (Cl. 91—378)

The invention relates to hydraulic apparatus, and in particular to hydraulic actuators and hydraulically actuated valves for use, for example, in process control systems.

Hitherto, when it has been required to operate a valve for the control of liquid or gas by a hydraulic actuator, the valve has usually been of the sluice or gate type, and has been operated by means of a hydraulic jack. Where a butterfly valve or other apparatus requiring a limited rotary motion has been used, this rotary motion has usually been obtained by means of a hydraulic jack and a link-work or rack and pinion mechanism.

An object of the present invention is to provide a hydraulic actuator of compact form capable of giving rotary motion.

According to the present invention, a hydraulic actuator comprises a cylinder provided with a coaxial rotatable shaft carrying a vane extending to the walls of the cylinder, a bridge extending between the shaft and the cylinder walls so that together with the vane it divides the cylinder into two separate chambers, and a hydraulic valve within the shaft arranged in operation to admit hydraulic fluid under pressure to either chamber and to exhaust it from the other through passages in the shaft.

The vane may include seals arranged so as to prevent the escape of fluid between it and the walls of the cylinder, or the surfaces of the vane and cylinder may be accurately finished to such tolerances as to avoid excessive internal leakage of fluid.

The valve may be so constructed that its neutral point, that is to say, the point or region of its travel at which the transition takes place from movement of the vane in one direction to movement in the other, changes as the shaft rotates, so that the shaft rotates in correspondence with movement of the valve element to provide a follow-up action. The valve may be a rotary valve, so that this follow-up action is achieved directly, since the ports in the shaft with which the land piece cooperates will rotate as the vane rotates, or the piece may be arranged for linear motion in an axial direction, and the valve ports may be provided in a sleeve which is advanced or withdrawn by means of a cam or screw-thread motion as the shaft rotates to provide the follow-up action.

In one preferred form of the invention the ports are provided in a sleeve arranged to rotate with the shaft, the land piece being arranged to move axially within the sleeve, and a threaded portion of the sleeve is arranged to rotate within a nut to provide axial movement of the sleeve, the nut being independently rotatable to provide, for example, a manually settable input part.

If the valve is arranged for linear operation the land piece may be positioned by a torque motor, and this may be immersed in the hydraulic fluid at the outlet pressure chamber of the housing.

The invention includes within its scope combinations of an actuator as described above with a fluid control valve of the butterfly type.

Figure 2:
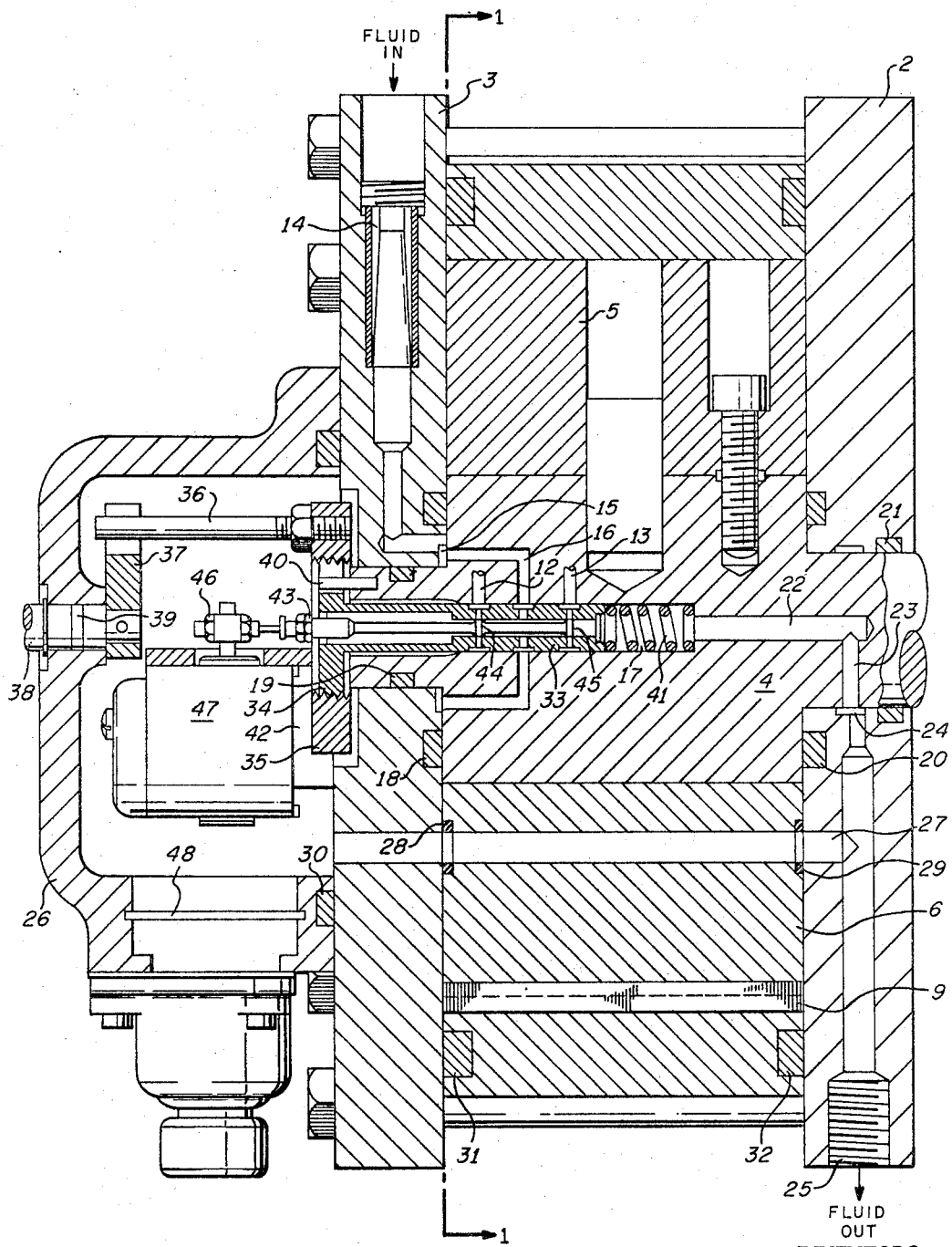

The invention will be further described by way of example with reference to the accompanying drawings, in which FIG. 1 is a view partially in section of the apparatus according to the invention taken along line 1—1 of FIG. 2; and FIG. 2 is a vertical sectional view through the complete apparatus taken along line 2—2 of FIG. 1.

Referring first to FIG. 1, the apparatus comprises a metal cylinder 1 closed by end plates 2 and 3 (FIG. 2). Within the cylinder is a shaft 4 on which a stout metal vane 5 is mounted by means of metal dowels and screws. A segment of metal 6 accurately machined to fit against the inner surface of the cylinder and the surface of the shaft 4 forms a bridge, which, together with a rotary piston structure or vane 5, divides the remaining volume of the cylinder into two operating chambers 7 and 8. The bridge 6 is keyed in position by a metal key 9 of square section, which fits into rectangular keyways formed in the wall of the cylinder 1 and the segment 6 so as to lock them firmly together against rotational motion about the cylinder axis, and metal blocks 10 and 11 form stops to limit the motion of the vane 5.

Oil is admitted to or exhausted from the operating chambers 7 and 8 through passages 12 and 13 drilled radially through the shaft 4 to communicate with a valve means shown in FIG. 2.

Referring now to FIGURE 2, the end plates 3 contains an inlet passageway 14 arranged to receive a sintered metal filter to remove particles from the oil which forms the actuating fluid, and this passageway forms the high pressure inlet to the valve means. Passages from this inlet extend to an annular recess 15 on the inside of the end plate 3 of the housing from which a system of passages 16 leads to the inlet port of the valve means, which is within an axial cavity 17 in the shaft. An annular oil seal 18 in the end plate 3 surrounds the cavity 15, and a seal 19 seals the collar of the shaft where it passes through the end plate 3, preventing oil under pressure from escaping to the outer side of this plate. At the other end plate 2 a similar pair of oil seals 20 and 21 prevent leakage of high pressure oil beyond the end plate 2. The axial cavity 17 is extended by passages 22 and 23 to an oil way 24 between the seals 20 and 21 which is connected to a fluid outlet passageway 25 to provide a path for oil exhausted from the right hand end of the valve means, as viewed in FIG. 2. Oil exhausted from the left hand or other end of the valve means passes into a fluid outlet chamber or enclosure 26 which contains part of the operating mechanism (to be described below) from which it is led back to the outlet 25 by a passageway 27 extending through the segment 6 and provided with annular seals 28 and 29 to prevent leakage of high pressure oil. A pair of sealing rings 31 and 32 in the ends of the cylinder wall prevent escape of oil between the differential chambers 7, 8 and the end plates 2 and 3.

The enclosure 26 is filled with oil in operation, and is sealed by an annular seal 30 where it is attached to the end plate 3. Since the space between the seals 20 and 21 is vented to the exhaust tank, all the external seals, with the exception of the seals 31 and 32 between the cylinder and the end plates, are exposed only to the exhaust oil pressure.

The valve means is contained within the axial cavity 17 of the shaft 4 and consists of a slidable sleeve 33 in which are formed of axially spaced control ports that communicate with the chambers 7 and 8 through passageways 12 and 13 in the shaft 4 and a fluid inlet port between the control ports that connects with inlet passageway 14 by way of the annular recess 15 and passage 16. The sleeve 33 is free to move to and fro axially within the cavity 17 and has an enlarged screw threaded head 34 which meshes with a threaded nut 35. Nut 35 is a settable element that is moved about the axis of the sleeve 33 by means of a pin 36 engaged by a forked member 37 carried on a control shaft 38 passing through the outer wall of the enclosure 26 through an oil seal 39. The screw threaded head 34 of the connection meshing with nut 35 is slotted, and the slot is engaged by a pin 40 fastened into the shaft 4, so that the sleeve 33 always rotates with the shaft. A spring 41 presses the sleeve 33 and nut 35 towards a retaining member 42 so as to take up any backlash in the screw threads and keep the parts in biased engagement. Spring 41 is a compression member with one end engaging the right hand end of the sleeve 33 as viewed in FIG. 2 and the other end engaging a flange in the axial cavity 17. The control piece 43 of the valve consists of a spindle having raised lands 44, 45 formed on it, which, in the neutral position of the valve, exactly correspond to the control ports in the sleeve 33 communicating through the passages 12 and 13 with the chambers 7 and 8. The inlet port communicating with the high pressure of fluid inlet is between the two lands, and the space beyond the lands communicates with the outlet passageway 25, to one side through the passages 22 and 23, and to the other through the fluid outlet chamber 26 and passage 27.

The end of the control piece 43 of the valve means is operatively connected to an arm 46 on the rotor of a torque motor 47 whose stator is immersed in the hydraulic fluid which fills the fluid outlet chamber 26. Electrical connection to this torque motor is made through an oil-tight seal 48, and the motor is so designed that the displacement of the arm 46 is proportional to the current supplied to the torque motor.

The actuator is installed with the high pressure oil supply connected to the inlet passageway 14 and the outlet passageway 25 connected to an exhaust tank. With the valve in its neutral position as shown, both the operating chambers 7 and 8 are cut off from the fluid inlet and outlet, and the actuator is hydraulically locked.

When current is supplied to the torque motor 47 its output shaft rotates and by means of the arm 46 causes an axial movement of the valve operating piece 43 proportional to the current. This causes the lands 44 and 45 to uncover the control ports in the sleeve 33 and admit oil to one of the chambers 7 and 8 and permit it to exhaust from the other, thus causing the piston structure 5 and shaft 4 to rotate. The pin 40 turns the sleeve 33 and causes its screw threaded head 34 to travel axially within the nut 35 until the ports again are aligned with the lands 44 and 45, whereupon movement ceases.

By rotating the shaft 38 the nut 35 may be turned to move the sleeve backwards or forwards and thereby to set the position to which the valve will return on interruption of the electric supply to the torque motor 47. Alternatively, by cutting off the supply to this motor, the shaft 38 can be used to operate the apparatus manually.

What is claimed is:

1. Apparatus utilizing an actuating fluid including a housing having differential fluid pressure chambers and a fluid outlet chamber, a shaft mounted in the housing to move about an axis having an axial cavity with an open end arranged in the housing in adjoining relation with the fluid outlet chamber, stop means between the housing and shaft for limiting the angular motion of the shaft about the axis, a piston structure extending from the shaft between the differential fluid pressure chambers in the housing and adapted to oscillate angularly with said shaft; valve means for the differential chambers including a sleeve slidable in the axial cavity in the shaft having respective open ends, respective axially spaced control ports and a fluid inlet port between the control ports, a piece mounted within the sleeve to move along the axis having lands spaced to cooperate with the control ports in the sleeve; a fluid inlet passageway in the shaft to the inlet port, a fluid inlet passageway in the housing to the shaft inlet passageway, a fluid passageway in the shaft between one of the control ports and one of the differential chambers, a fluid passageway in the shaft between the other of the control ports and the other of the differential chambers, a fluid passageway in the housing to the fluid outlet chamber and a passageway in the housing between the outlet passageway and the other end of the sleeve of the valve means; a settable input part, means for connecting the sleeve and the shaft to the settable input part to adjust the neutral point of the valve means, and input means having a part fixed to the housing and a part operatively connected to the land piece.

2. Apparatus of the character claimed in claim 1, in which the settable input part includes a nut with an axis concentric to the axis of the sleeve, and the connecting means includes screw threaded means on the sleeve in mesh with the nut.

3. Apparatus of the character claimed in claim 2, including spring means for biasing the threaded means and nut in operative engagement along the axis having an end engaging the other end of the sleeve and an end engaging a flange in the cavity in the shaft.

4. Apparatus of the character claimed in claim 3, having a pin and slot connection between the shaft and the sleeve through which the sleeve follows the oscillatory motion of the shaft about the axis and is movable axially with relation to the shaft by the settable input part.

5. Apparatus of the character claimed in claim 4, in which the nut, the screw threaded means and the pin and slot connection are located in the fluid outlet chamber of the housing.

6. Apparatus of the character claimed in claim 1, in which the input means is a torque motor with a stator located in the fluid outlet chamber of the housing and a rotor operatively connected to the land piece.

References Cited by the Examiner

UNITED STATES PATENTS

| 2,411,119 | 11/1946 | Stephens | 91—376 |
| 2,708,353 | 5/1955 | Brady | 91—376 |

FOREIGN PATENTS

| 64,189 | 5/1955 | France. |
| 464,891 | 4/1937 | Great Britain. |

MARTIN P. SCHWADRON, *Primary Examiner.*

FRED E. ENGELTHALER, SAMUEL LEVINE,
*Examiners.*

P. E. MASLOUSKY, *Assistant Examiner.*